United States Patent [19]

Nolting et al.

[11] 4,329,875
[45] May 18, 1982

[54] ULTRA SENSITIVE LIQUID LEVEL DETECTOR AND METHOD

[75] Inventors: Jerry L. Nolting, Fishkill; Ralph C. Muller, Hopewell Junction, both of N.Y.

[73] Assignee: Texaco Inc., White Plains, N.Y.

[21] Appl. No.: 135,407

[22] Filed: Mar. 31, 1980

[51] Int. Cl.³ ............................................. G01F 23/22
[52] U.S. Cl. ................................. 73/290 V; 340/621
[58] Field of Search ............... 73/290 V, 579, 29, 171; 340/621; 310/321; 73/202, 203

[56] References Cited

U.S. PATENT DOCUMENTS

| 3,110,890 | 11/1963 | Westcott et al. | 73/290 V |
| 3,133,442 | 5/1964 | Werner | 73/290 V |
| 4,231,250 | 11/1980 | Leber | 73/290 V |
| 4,240,285 | 12/1980 | Langdon | 73/290 V |

FOREIGN PATENT DOCUMENTS

| 720970 | 11/1965 | Canada | 340/621 |
| 883904 | 12/1961 | United Kingdom | 73/290 V |

Primary Examiner—James J. Gill
Attorney, Agent, or Firm—Carl G. Ries; Robert A. Kulason; Henry C. Dearborn

[57] ABSTRACT

A highly sensitive liquid level detection system. It employs a piezoelectric transducer that has a natural frequency of vibration which effectively varies depending upon the amount that the transducer is immersed in a liquid. An emf is applied to the transducer to cause it to vibrate at the effective natural frequency, and the exact frequency is counted which count indicates the amount of immersion with a high degree of accuracy. A printer may be employed to periodically record the frequency count.

12 Claims, 5 Drawing Figures

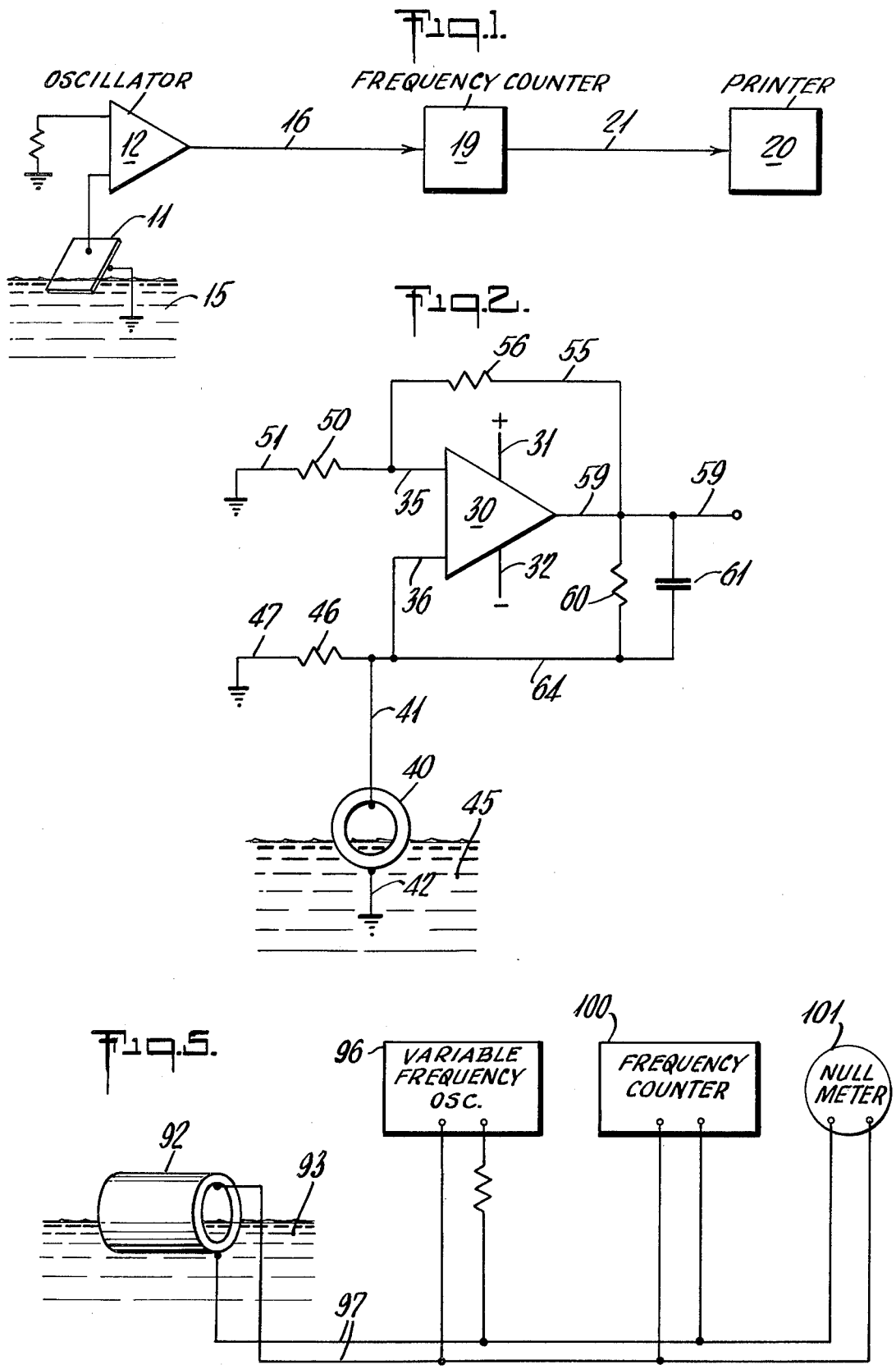

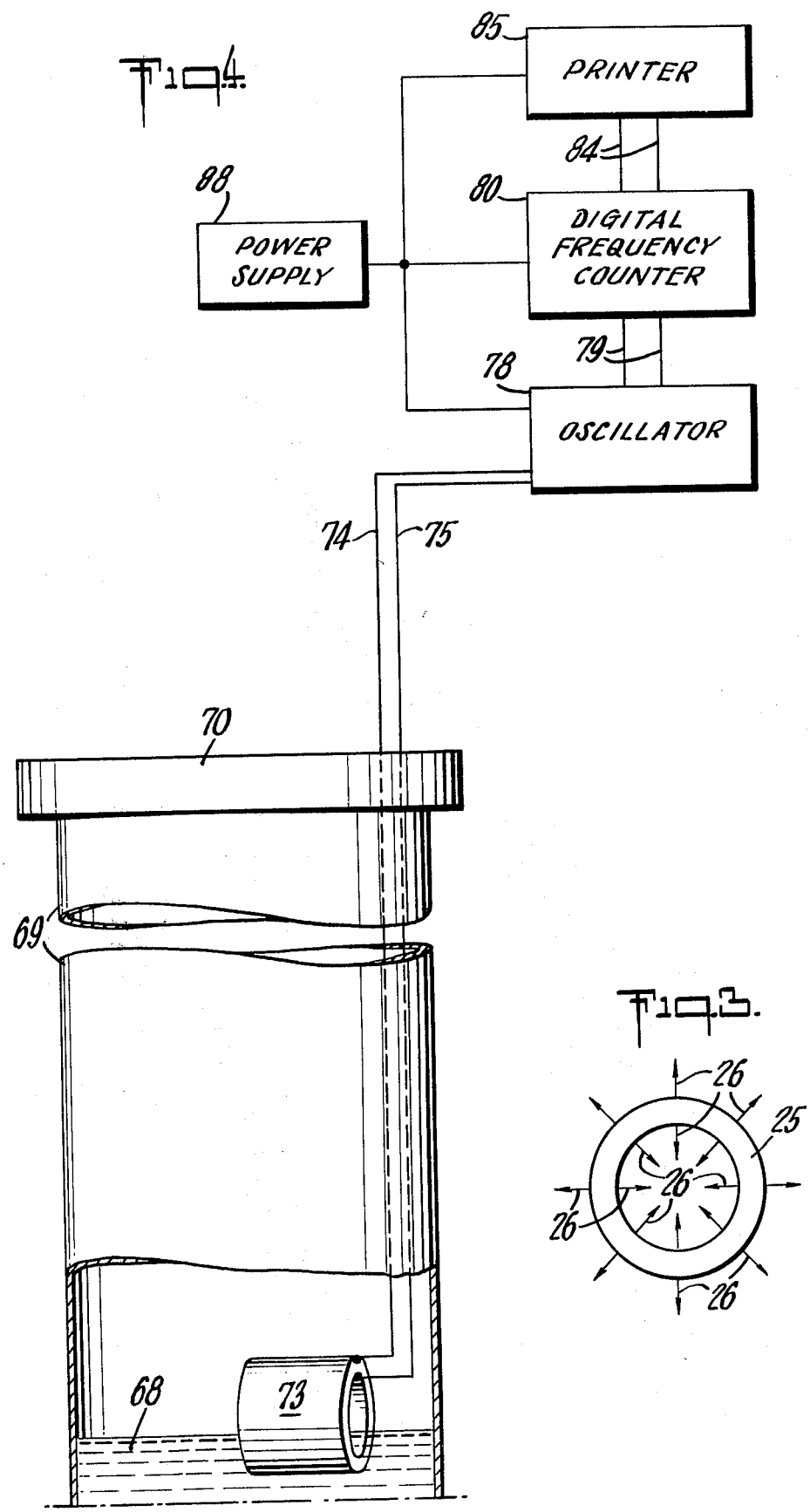

ULTRA SENSITIVE LIQUID LEVEL DETECTOR AND METHOD

BACKGROUND OF THE INVENTION

1. Field of the Invention

This invention concerns liquid level detection systems in general and, more specifically, deals with an ultra sensitive liquid level detector system and/or method which is extremely simple to construct and yet highly accurate and therefore effective in particular applications of liquid level measurement for small level changes.

2. Description of the Prior Art

There are numerous patents dealing with measurement of fluid or liquid levels. Among such patents are three examples of a type where the measurement is substantially a mere indication of the presence or absence of the liquid at a given location, e.g. that of a detection instrument in the system. Examples are: U.S. Pat. Nos. 3,110,890, V. C. Westcott et al., Nov. 12, 1963; 3,256,738, S. F. Di Giacomo et al., June 21, 1966; and 4,165,641, Pomerantz et al., Aug. 28, 1979. Clearly, the type of liquid level determination in these patents deals with the mere presence or absence of the liquid at a particular location, and as such it is not relevant to the applicants' invention.

There are also prior patents such as U.S. Pat. Nos. 3,825,025, Samuel et al., July 23, 1974 and 3,889,523, Nolte, June 17, 1975. These two patents make measurements of liquid level by using a driving crystal that introduces acoustic energy into the liquid. Then, they make a determination of the response to the acoustic energy. The response is measured by a receiver element which provides for the indication of level of the liquid that transmitted the acoustic energies. While the frequencies involved in those systems, may be in the general range of frequencies which are of concern in the applicants' invention, the principle of operation is entirely different. Also, it is quite doubtful that the accuracy obtainable with those patents can approach that of the applicants' invention.

In addition, there is a U.S. Pat. No. 4,170,311, Spaw, Oct. 9, 1979, which discloses a system that measures the level of a mass of dry material. It is done with a sensing probe that acts as an antenna, the oscillation frequency of which is varied in dependence upon the depth of the material being sensed by that antenna. This has some general similarity to the system according to the applicants' invention. However, it is clearly not substantially relevant and would not be applicable to a liquid measurement of the type with which the applicants' invention is concerned.

Consequently, it is an object of this invention to provide a system and/or method for making a highly sensitive liquid level measurement making use of the natural frequency of vibration of a piezoelectric transducer.

SUMMARY OF THE INVENTION

Briefly, the invention concerns an ultra sensitive liquid level detector which comprises in combination a transducer for partial immersion in said liquid, and a variable frequency oscillator having said transducer associated therewith to control the frequency of oscillation. It also comprises means for monitoring said oscillation frequency to determine the level of said liquid relative to said transducer.

Again briefly, the invention concerns a method of detecting minute variations in level of a liquid. It comprises the steps of partially immersing a piezoelectric transducer in said liquid, and connecting said transducer in an oscillator circuit to control the frequency of oscillation in accordance with the vibrating mass of the non-immersed portion of said transducer. Also, it comprises the step of measuring said frequency of oscillation to determine said liquid level relative to said transducer.

Again briefly, it comprises a system for measuring minute liquid level changes which comprises in combination a piezoelectric transducer having a natural frequency of vibration which varies in accordance with the amount of immersion in a liquid, and means for subjecting said transducer to an emf having a frequency which includes said natural frequency when said transducer is partially immersed. It also comprises means for exactly determining said last named natural frequency.

Once again, briefly, the invention concerns an ultra sensitive liquid level detector which comprises in combination a piezoelectric transducer having a natural frequency of vibration that is effectively variable depending upon the amount of immersion in said liquid. It also comprises an electrical oscillating circuit having said transducer connected therein to control the frequency of oscillation in accordance with said variable natural frequency, and a frequency counter connected to said electrical oscillating circuit to determine the exact frequency which indicates the amount of immersion of said transducer with a high degree of accuracy.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 1 is a schematic diagram illustrating basic elements of a system according to the invention;

FIG. 2 is a schematic circuit diagram of an oscillator including transducer which is connected into the oscillator circuit illustrated;

FIG. 3 is a diagrammatic showing illustrating the vibration mode of a hollow cylindrical transducer like that indicated in FIG. 2 when under piezoelectric forces;

FIG. 4 is a schematic diagram illustrating one application of a system according to the invention which is for measuring liquid level in a fill tube of a tank of liquid; and FIG. 5 is a diagrammatic illustration showing a modification of a system according to the invention.

DESCRIPTION OF THE PREFERRED EMBODIMENTS

This invention provides a very simple yet highly accurate system and/or method for accurately measuring liquid level and, of course, change thereof. FIG. 1 schematically illustrates the basic elements involved in one preferred system according to the invention. Thus, there is a piezoelectric transducer 11 that is connected in the circuit of an oscillator 12 so as to control the frequency of oscillation thereof. Such frequency of oscillation, as controlled by the transducer 11, depends upon the amount of immersion of transducer 11 in a body of liquid 15.

It may be noted that the transducer 11 is a piezoelectric material element which is preferably a barium titanate ceramic. It will be understood that such a transducer employs electrodes that are conductive material coatings on opposed faces of the transducer. The piezoelectric effects act in a well known manner as an emf is applied to these electrode surfaces.

The output of the oscillator 12 is connected by an electrical connection 16 to a frequency counter 19. The counter 19 makes continuous count of the frequency in cycles per second, and there may be a printer 20 connected to the frequency counter 19 by a connection 21. It will be appreciated that the printer 20 may be arranged for periodically printing an indication of the output frequency as it is determined by the frequency counter 19.

It will be understood that the oscillator circuit 12 may take various forms. The system illustrated has the inputs arranged so that the oscillation frequency is determined by the vibrating mass of the transducer 11 that is free to vibrate under piezoelectric effects. Consequently, such vibration frequency will vary in dependence upon the amount of immersion of the transducer 11 in the body of liquid 15. Details of a preferred oscillator circuit will be described more fully below in connection with the FIG. 2 illustration.

It may be noted that the piezoelectric transducer 11 may have various geometric shapes, so long as the shape is such that the frequency of oscillation will vary in accordance with the amount of immersion of the transducer in a body of liquid. Thus, the geometric shape will have a shorter dimension about which it vibrates in controlling the oscillation frequency. Such vibration is schematically indicated in FIG. 3 where a hollow cylindrical transducer 25 is indicated. It will be understood that this form has conductively coated electrode surfaces inside and out on the cylinder. Consequently, the vibrating mode of the piezoelectric action is radial, as indicated by arrows 26, shown.

FIG. 2 illustrates the details of a preferred oscillator circuit which may be employed in a system according to the invention. This oscillator employs an operational amplifier 30 that has power input connections 31 and 32 for applying positive and negative DC power connections in a conventional manner, and there are two amplifier input connections 35 and 36 to the amplifier 30.

Input connection 36 has one of the electrodes of a transducer 40 connected thereto via a circuit connection 41. The other electrode is connected to ground as indicated, via a circuit connection 42. Transducer 40 is partially immersed in a body of liquid 45. There is a resistor 46 that is connected in parallel with the transducer 40. One end of the resistor 46 is connected to the connections 36 and 41, and the other end is connected to ground via a connection 47.

The other input connection 35 to the amplifier 30 has one end of a resistor 50 connected thereto, while the other end is connected to ground via a circuit connection 51. There is a feedback connection 55 with a resistor 56 therein. It goes from an output circuit 59 back to the input connection 35 of the amplifier 30.

On the other side of the amplifier 30, the output circuit 59 has a resistor 60 in parallel with a capacitor 61. These are connected back via a circuit connection 64 to join the connections 36 and 41 of the other input to amplifier 30.

It will be appreciated that the foregoing provides an oscillator circuit which has the frequency of oscillation thereof controlled in accordance with the vibrating mass of the non-immersed portion of the transducer 40. This controlled oscillation frequency is measured and it may be calibrated in terms of the liquid level of the body of liquid 45 relative to the transducer 40.

FIG. 4 illustrates an application of a system according to the invention. It illustrates the measurement of liquid level in an enclosure such as an underground tank, where the detection of leaks is of paramount importance. In the illustrated case, a body of liquid 68 is confined within a fill tube, or pipe 69 that has a cap 70 at the surface. Cap 70 is arranged for removal to introduce the liquid product 68.

The liquid level monitoring system includes a hollow cylindrical transducer 73 that is supported in a fixed position relative to the fill tube 69 and partially immersed in the liquid 68. Such support is carried out by any feasible structure (not shown). It will be preferably supported at a position with approximately half, or slightly less of the transducer immersed in the liquid 68. The transducer 73 is connected to a circuit like that described above in connection with FIGS. 1 and 2. Thus, there are circuit connections 74 and 75 which go from the transducer 73 to an oscillator 78. The oscillator is connected to a digital frequency counter 80 via circuit connections 79, and the frequency counter 80 may have its output connected via connections 84 to a printer 85. The diagram also illustrates a power supply 88 that has the necessary connections, as schematically indicated, which go to each of the system elements, i.e. the oscillator 78, the frequency counter 80 and the printer 85.

As indicated above, the oscillator 78 may be like that described in connection with FIG. 2. Preferably, the frequency counter 80 is a digital type, such as one manufactured by Data Precision Corporation which has an office at Electronic Ave. in Danvers, Mass. 01923. The frequency counter is used in a 10 sec. timing mode and so every 10 seconds a timing pulse may be employed to trigger the printer 85 for printing the frequency count at that time. The printer employed may be one like an instrument manufactured by Datel Systems Inc. that is a subsidiary of Intersil Datel Systems Inc. which has an address at 11 Cabot Blvd. in Mansfield, Mass. 02048.

With the foregoing arrangement, the level of liquid 68 may be continuously monitored with the frequency count printed every 10 seconds. Thus, as indicated above, by having calibrated the frequency output of the oscillator 78 in relation to the amount of immersion of the transducer 73, the liquid level will be accurately monitored periodically at predetermined intervals.

It may be noted that use of a hollow cylindrical transducer has been made. And, the orientation of the transducer relative to the liquid being measured is according to FIGS. 2 and 4, i.e. transducers 40 and 73 lying on their sides. It was discovered that such orientation is preferably to having the cylinder standing upright because the latter position developed many undesirable harmonics in the natural frequency of vibration. It is to be expected that various geometrical configurations might be advantageous for particular situations. And, as indicated above, a thin rectangular transducer 11 is illustrated in the FIG. 1 modification.

A working system in accordance with the FIG. 2 illustration has been constructed using the following specific elements:

Transducer 40—approximately one inch long × one inch diameter and $\frac{1}{8}$ inch wall thickness, manufactured by Transducer Products of Torrington, Conn.

Amplifier 30—an RCA 3140 OP Amp.
Resistor 46—3.3. kilo-ohms.
Resistor 60—15 megohms.
Capacitor 61—51 pico-farads
Resistor 50—1 kilo-ohms
Resistor 56—100 kilo-ohms
DC Power Supply (31,32)—15 volts plus and minus.
Frequency developed—approximately 75 kilocycles.

FIG. 5 illustrates a modified arrangement for carrying out the liquid level measurement according to this invention. In this case, a transducer 92 is partially immersed in a body of liquid 93. There is a variable frequency oscillator 96 which has its output connected to the electrodes of the transducer 92 via a pair of circuit connections 97 that also go to a frequency counter 100, and a null meter 10.

In this modification the variable frequency oscillator 96 excites the transducer 92 and the natural frequency of vibration (which depends upon the amount of immersion in the liquid 93) will be indicated when the oscillator frequency is the same as that natural frequency of vibration. Such condition is determined by a sudden decrease in voltage which is indicated by the null meter 101. The exact frequency may then be read on the frequency counter 100 to indicate the natural frequency of the free vibrating mass of transducer 92. As indicated above, this may be calibrated in terms of the amount of immersion of transducer 92 in the liquid 93.

While particular embodiments of the invention have been described above in considerable detail in accordance with the applicable statutes, this is not to be taken as in any way limiting the invention but merely as being descriptive thereof.

We claim:

1. Ultra sensitive liquid level detector, comprising in combination
   a piezoelectric transducer partially immersed in said liquid,
   a variable frequency oscillator having said transducer associated therewith to control the frequency of oscillation in accordance with the vibrating mass of the non-immersed portion of said transducer, and
   frequency counter means for monitoring said oscillation frequency to determine the level of said liquid relative to said transducer.

2. Ultra sensitive liquid level detector according to claim 1, wherein
   said frequency counter is digital.

3. Ultra sensitive liquid level detector according to claim 2, further comprising
   a printer for periodically recording the output from said digital frequency counter.

4. Ultra sensitive liquid level detector according to claim 1, wherein
   said piezoelectric transducer has a geometric shape such that said controlled frequency of oscillation varies in accordance with the amount of said immersion.

5. Ultra sensitive liquid level detector according to claim 4, wherein
   said geometric shape has a shorter dimension about which it vibrates in controlling said oscillation frequency.

6. Ultra sensitive liquid level detector according to claim 5, wherein
   said transducer is constructed of a barium titanate ceramic.

7. Ultra sensitive liquid level detector according to claim 6, wherein
   said geometric shape is thin rectangular.

8. Method of detecting minute variation in level of a liquid, comprising the steps of
   partially immersing a piezoelectric transducer in said liquid,
   connecting said transducer in an oscillator circuit to control the frequency of oscillation in accordance with the vibrating mass of the non-immersed portion of said transducer, and measuring said frequency of oscillation to determine said liquid level relative to said transducer.

9. Ultra sensitive liquid level detector, comprising in combination
   a piezoelectric transducer having a natural frequency of vibration that is effectively variable depending upon the amount of immersion in said liquid,
   an electrical oscillating circuit having said transducer connected therein to control the frequency of oscillation in accordance with said variable natural frequency, and
   a frequency counter connected to said electrical oscillating circuit to determine the exact frequency which indicates the amount of immersion of said transducer with a high degree of accuracy.

10. Ultra sensitive liquid level detector according to claim 9, also comprising
    a printer connected to said frequency counter for periodically recording said exact frequency count.

11. Ultra sensitive liquid level detector comprising in combination
    a barium titanate ceramic piezoelectric transducer partially immersed in said liquid,
    said piezoelectric transducer having a hollow cylindrical geometric shape with a shorter dimension about which it vibrates in controlling the frequency of oscillation which varies in accordance with the amount of said immersion, and
    means for monitoring said oscillation frequency to determine the level of said liquid relative to said transducer.

12. Ultra sensitive liquid level detector according to claim 11, wherein
    said monitoring means is a frequency counter.

* * * * *